United States Patent [19]

Yoshitome

[11] Patent Number: 4,739,481
[45] Date of Patent: Apr. 19, 1988

[54] X-RAY CT IMAGE PROCESSING APPARATUS

[75] Inventor: Eiji Yoshitome, Tokyo, Japan

[73] Assignee: Yokogawa Medical Systems, Limited, Tokyo, Japan

[21] Appl. No.: 800,077

[22] PCT Filed: Mar. 13, 1985

[86] PCT No.: PCT/JP85/00124
§ 371 Date: Oct. 29, 1985
§ 102(e) Date: Oct. 29, 1985

[87] PCT Pub. No.: WO85/04090
PCT Pub. Date: Sep. 26, 1985

[30] Foreign Application Priority Data

Mar. 15, 1984 [JP] Japan ................................ 59-49688
May 31, 1984 [JP] Japan ................................ 59-111869

[51] Int. Cl.⁴ ............................................ G01N 23/02
[52] U.S. Cl. ...................................... 364/414; 250/367
[58] Field of Search ................ 364/414, 571; 250/367; 378/901, 19, 2, 19, 27

[56] References Cited

U.S. PATENT DOCUMENTS

| 4,223,384 | 9/1980 | Hounsfield | 364/414 |
| 4,247,774 | 1/1981 | Brooks | 250/367 |
| 4,272,820 | 6/1981 | Lux | 364/414 |
| 4,654,796 | 3/1987 | Takagi | 364/414 |
| 4,654,797 | 3/1987 | Fujita | 364/414 |

FOREIGN PATENT DOCUMENTS

1576286 10/1980 United Kingdom.

Primary Examiner—Michael R. Fleming
Attorney, Agent, or Firm—Moonray Kojima

[57] ABSTRACT

This invention concerns an X-ray CT image processing apparatus capable correcting the bone-induced beam hardening only based on the reconstructed image data at a high speed and simply, in which the bone region of the reconstructed image is discriminated based on the reconstructed image data, a correcting image data is determined through the masked addition or convolution of a 2-dimensional weight function using thus discriminated bone region as a mask and the correcting image data are added to the reconstructed image data.

5 Claims, 13 Drawing Sheets

X-RAY CT IMAGE PROCESSING APPARATUS

TECHNICAL FIELD

This invention concerns X-ray CT image processing apparatus adapted to eliminate the bone-induced beam hardening artifact resulted in X-ray CT images (CT is an abbreviation for computed tomography) at high speed by the correcting computation using only the reconstructed image data.

BACKGROUND ART

Correction for the bone-induced beam hardening to X-ray CT images has usually been made as found in Joseph, et al. literatures (Joseph, et al. A Method for Correcting Bone Induced Artifacts in Computed Tomography Scanners, Journal of Computer Assisted Tomography vol. 2, p 100–108, Jan. 1978) by scanning the reconstructed image elements, calculating the correction amount from the pass length of the soft tissue portion and bone (separated with CT values) contained therein, correcting the same with the actual scan data and, thereafter, reconstructing them again.

However, the method has the following problems.

(1) Since twice reconstructing and once scanning of the image elements are required, the computing amount is enormous and no high speed processing can be expected (2) While it is customary to erase the actual scan data after once reconstructing the image to prepare for the next scanning, the actual scan data have to be preserved after the image reconstruction till the correction of the actual scan data and the second image reconstruction have been completed.

DISCLOSURE OF INVENTION

The object of this invention is to provide an X-ray CT image processing apparatus capable of conducting correction for bone induced beam hardening only based on the reconstructed image data at high speed and simply.

In order to attain the above object, this invention is adapted to judge the bone region in the reconstructed image based on the reconstructed image data, form the correcting image through mask addition or convolution of a 2-dimensional weight function using the judged bone region as a mask and add the correcting image to the reconstructed image.

BEST MODE FOR CARRYING OUT THE INVENTION

Figure 1:
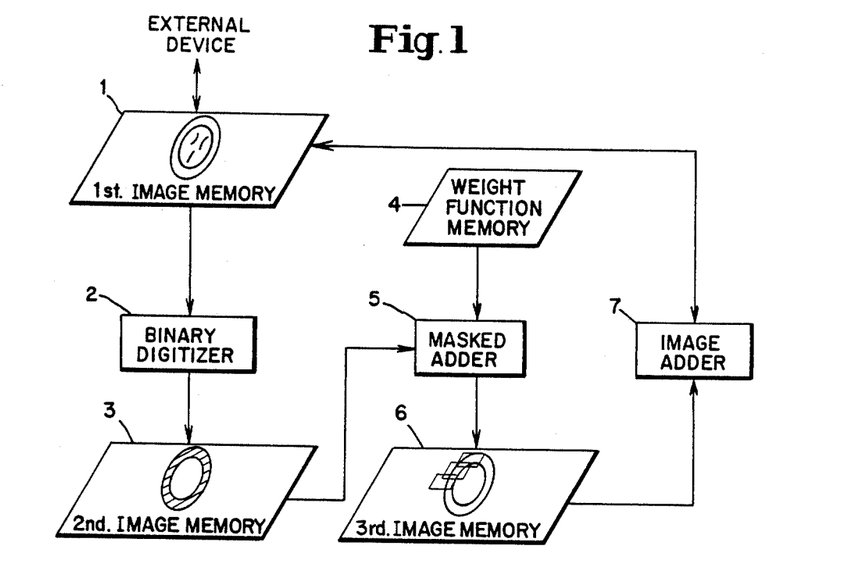
FIG. 1 is a block diagram for one embodiment of an X-ray CT image processing apparatus for practicing this invention.

Embodiments of this invention will now be described more specifically referring to drawings. FIG. 1 is a constitutional block diagram showing one embodiment of the X-ray CT image processing apparatus according to this invention. In the drawing, are shown a first image memory 1 for storing the reconstructed image, a binary digitizer 2, a second image memory 3, a weight function memory 4, a masked adder 5, a third image memory 6 and an image adder 7. The binary digitizer 2, the masked adder 5 and the image adder 7 are realized by the hardware of a computer and a program providing the respective functions thereof. The situations are the same for each of the devices shown by the blocks in FIGS. 6, 8, 13, and 14.

The first image memory 1 is adapted such that it can input and output the image to and from an external device (not shown). The external device includes an image reconstructing device which outputs the reconstructed image to the image memory 1 and an image display device for displaying the image outputted from the image memory 1, etc.

Figure 2:
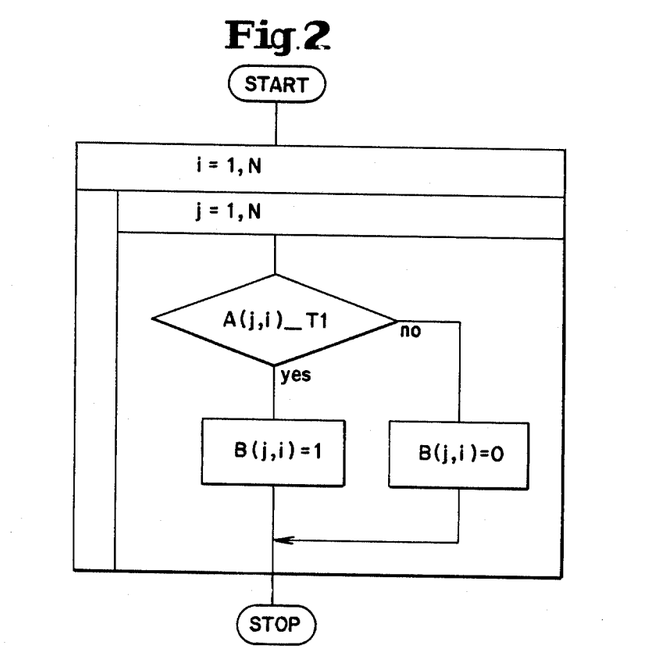
FIG. 2 is a flow chart showing the function of the binarizing digitizer in FIG. 1.

The binary digitizer 2 binarizes the image on the first image memory 1 using a predetermined CT value as a threshold value and has a function as shown by the flow chart in FIG. 2.

In FIG. 2 i, j represent the respective components of the 2-dimensional address of the image data in an image memory space, each of which takes a value from 1 to N. A(j, i) and B(j, i) are image data on separate image memories and each at the address (j, i). In other flow charts, the identical symbols mean the same contents. According to the function shown in FIG. 2, the input image data A(j, i) from the first image memory 1 are compared with threshold value T1 and the output image data B(j, i) to the second image memory 3 are rendered to 1 or 0 depending on whether they are greater than the threshold value T1 or not respectively. Such a data processing is repeated till both of j and i reach N, by which all of the image data in the first image memory 1 are binarized and written into the second image memory 3. The second memory 3 stores these binary images. Since the threshold value T1 is predetermined corresponding to the bone CT value, binary image representing the bone image is obtained in the second image memory 3. The binary digitizer 2 and the second image memory 3 constitute a bone image extracting device.

Figure 3:
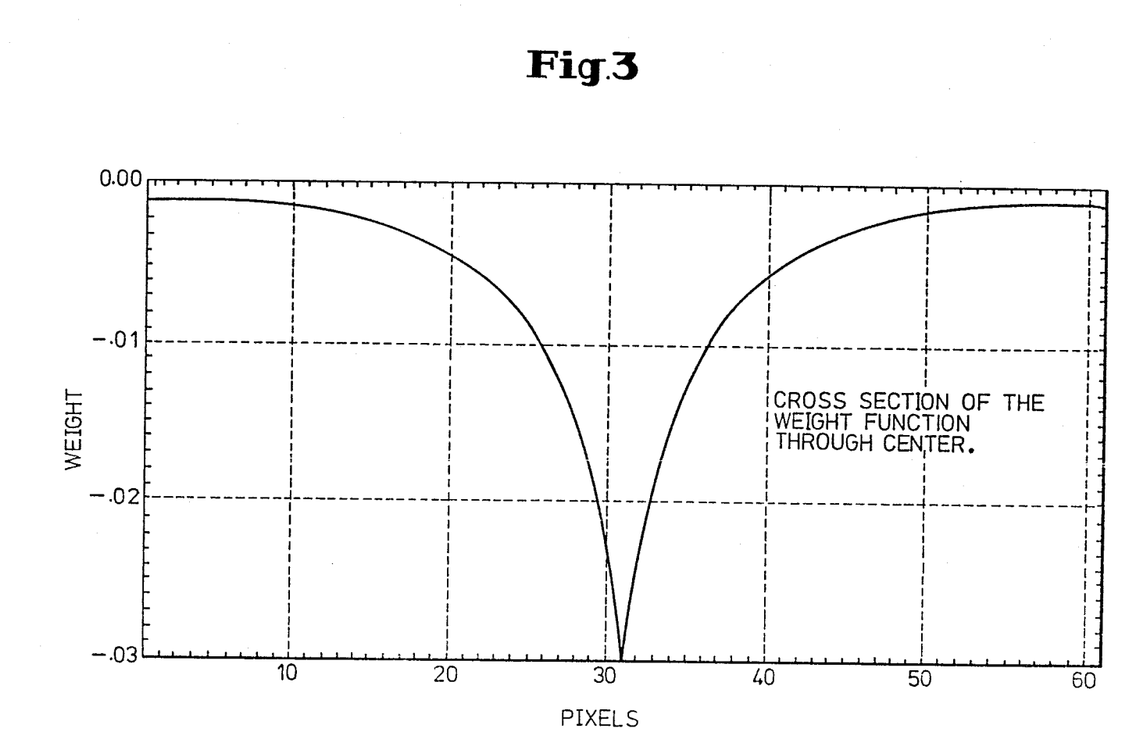
FIG. 3 is a graph showing a weight function utilized by the masked adder in FIG. 1.

The weight function memory 4 stores a predetermined 2-dimensional weight function. One example of the weight function is shown in FIG. 3. FIG. 3 shows the 2-dimensional weight function as the cross section along the central axis thereof. The value of the weight function takes a negative value which is lowest at the center and gradually approaches zero as aparted from the center while reducing the gradient thereof. The weight function has a characteristic approximately $-K/(1+\alpha\gamma)^4$ assuming the distance from the center as $\gamma$. The masked adder 5 receives the outputs from the weight function memory 4 and the second image memory 3 and adds them to store the result in the third image memory 6 alighning the center of the weight function, which diverges on the 2-dimensional manner, with the position of the picture element with high CT values representing the bone on the binary image.

Figure 4:
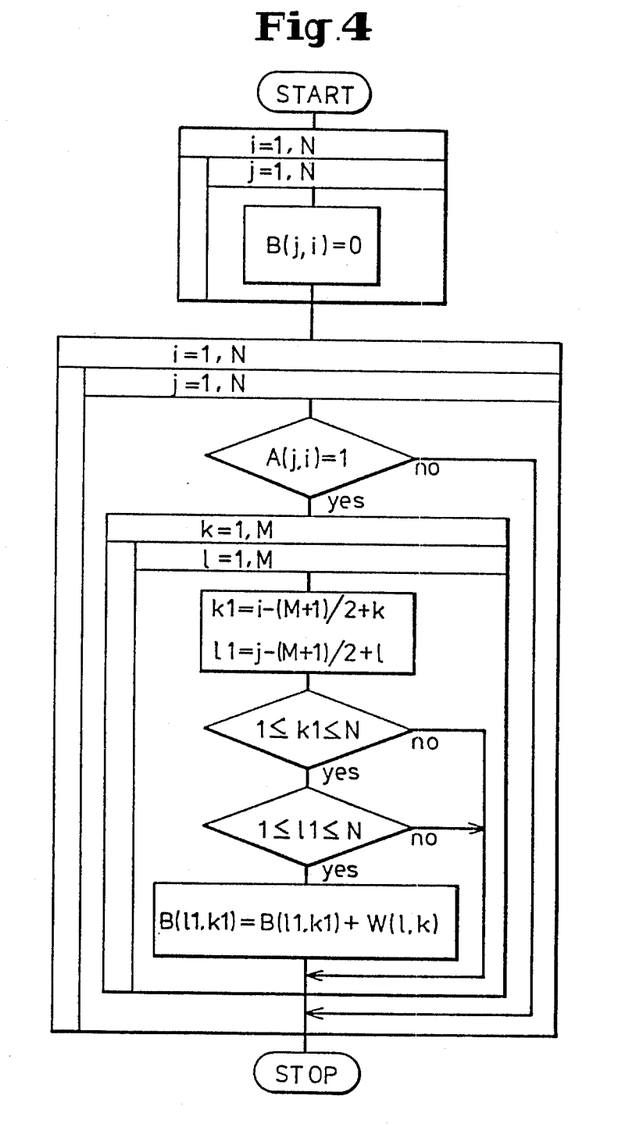
FIG. 4 is a flow chart showing the function of the masked adder in FIG. 1.

FIG. 4 shows the function of the masked adder 5. According to this function, the output data B(j, i) having zero value are at first written into the entire address of the third image memory 6. Then, it is judged whether each value of the input image data A(j, i) from the second image memory 3 is 1 or not and addition of the 2-dimensional function is carried out only when it is 1. Respective components of the 2-dimensional address in the memory 4 storing the 2-dimensional weight function are represented by k and l. Both of the address components take values from 1 to M. by using these address components k and l, the maximum value M therefor and the address components i, j for the input image data A(j, i), the address components k1, l1 converted by a pair of equations described in the central block of the figure are determined. These converted address components k1, l1 represent the respective components of the address to be occupied by the respective points on the 2-dimensional plane of the weight function in the image memory space when the center of the 2-dimensional function is aligned with the address (j, i) of the input image data A(j, i). Among these address components, only those within the range from 1 to M respectively, that is, those belonging to the range of the image memory space are taken as the address components for the output image data, and the addition of the weight function W (l, k) is carried out to the output image data B (l1, k1) according the the third equation described in the lower block in the figure. Such address conversion and the weight function addition are repeated for one input image data till both of k and l become M, that is, till the values for all of the points on the 2-dimensional plane of the weight function are added and till such addition is completed for the entire input image data A(j, i).

The masked adder 5 and the third image memory 6 constitute a correction image forming device.

Figure 5:
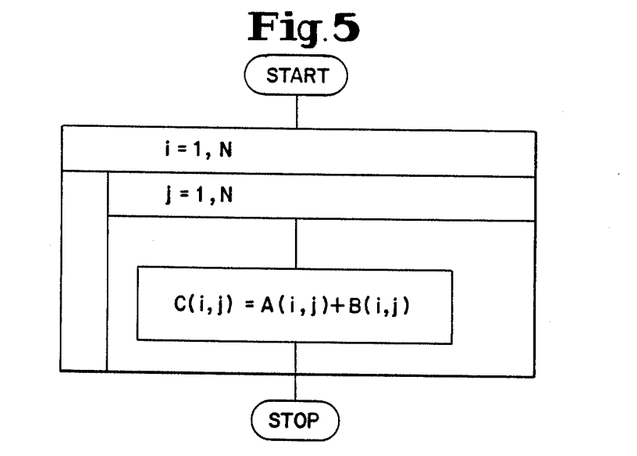
FIG. 5 is a flow chart showing the function of the image adder in FIG. 1.

The image adder 7 adds the image of the third image memory 6 and the image of the first image memory 1 and the images thus added are stored in the first image memory 1. The function of the image adder 7 is shown in FIG. 5. In FIG. 5, the input image data A(j, i) from the first image memory 1 and the input image data B(j, i) from the third image memory 6 are added and the image data C(j, i) as the result thereof are stoed in the first image memory 1.

In the device with such a structure shown in FIG. 1, the reconstructed X-ray CT images inputted from the external device to the first image memory 1 are binarized in the binary digitizer 2 while being compared with a previously determined threshold value. Then, the binarized images are successively stored in the second image memory 3. The masked adder 5 receives the binary image from the second image memory 3 and adds to store into the third image memory 6 a weight function diverging in a 2-dimensional manner while aligning the center of the weight function from the weight function memory 4 with the position of the picture element with the high CT value representing the bone on the binarized images. The initial memory value for the third memory 6 is set to zero. This addition treatment is repeated for all of the picture elements having CT values greater than the threshold value. By property selecting the characteristic of the weight function, images offsetting the bone-induced beam hardening artifact can be obtained in the third image memory 6.

The images thus formed in this way are added to the initially inputted reconstructed images stored in the first image memory 1 by the image adder 7. This enables to eliminate the bone-induced beam hardening artifact not using the actual scan data but using only the reconstructed data and the images thus removed with the beam hardening artifact are written into the first memory 1 and then outputted as required to the external device.

Figure 6:
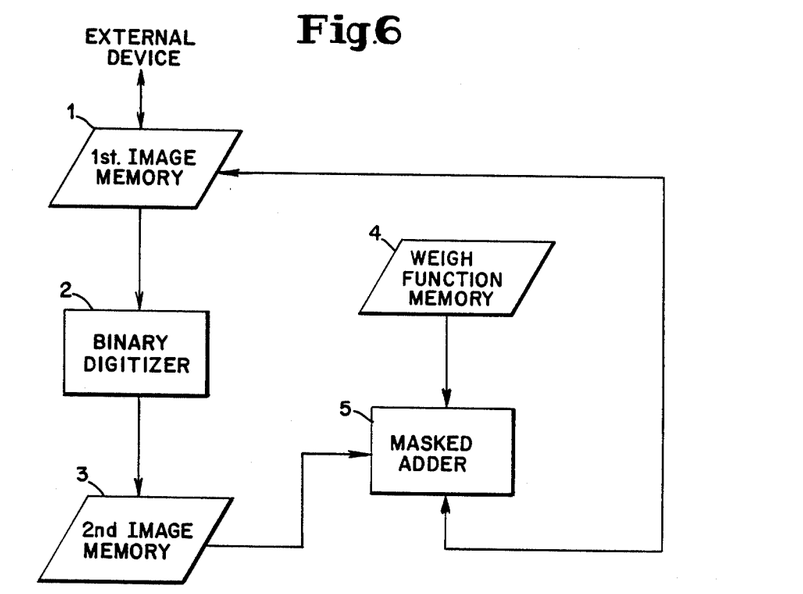
FIG. 6 is a block diagram showing another embodiment of the X-ray CT image processing apparatus practicing this invention.

FIG. 6 is a block diagram showing another embodiment of this invention. The difference from FIG. 1 is that the third image memory 6 and the image adder 7 are omitted. In FIG. 6, instead of taking the total sum of the weight function followed by subsequent addition between two images, the weight function is added directly to the reconstructed image at the corresponding positions and the result is written into the first image memory 1. With such a structure, the bone-induced beam hardening artifact can also be removed in the same manner as described above.

Figure 7:
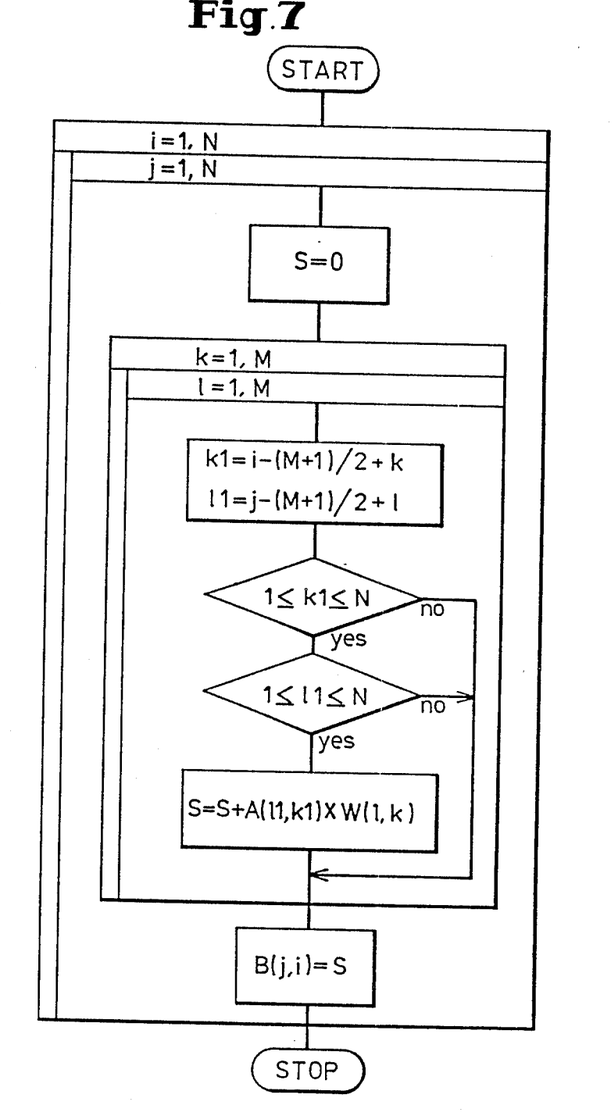
FIG. 7 is a flow chart showing the function of another embodiment of the masked adder in FIG. 1 and FIG. 2.

Instead of adding an identical weight function to the picture elements greater than a certain CT value, it is also possible to add a weight function to picture elements in excess of a certain CT value while modifying depending on the CT values of the picture elements Further, the masked adder 5 can be replaced with 2-dimensional convolution between the binarized images of the second image memory 3 and the weight function of the weight function memory 4. FIG. 7 shows the function of a 2-dimensional convolver that can replace the masked adder. In FIG. 7, the equation giving the value of S represents the 2-dimensional convolution.

In the above-described case, the bone region is discriminated by a threshold value processing in which a range having a CT value of greater than a certain value is considered as a bone. While this causes no problems in the case where the object is a head, a problem may be resulted in a case where the object to be scanned is unknown. For instance, if phantoms or the likes incorporated with Teflon (trade name) are scanned, since Teflon has substantially equal CT value to that of the bone, there is a problem that it can not be recognized whether the bone or the Teflon has been scanned. In view of the above, a bone region discriminator is required capable of simply and stably recognizing the bone region in a case where the object to be scanned in unknown.

Figure 8:
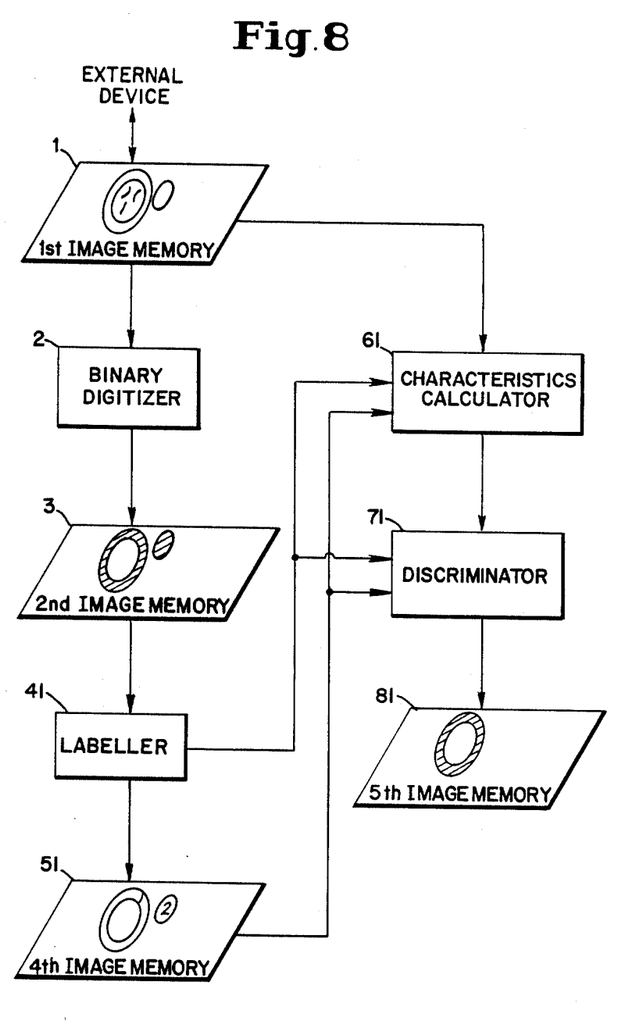
FIG. 8 is a block diagram for the device judging the bone region more precisely.

FIG. 8 is a block diagram showing one embodiment of the bone region discriminator. In FIG. 8, are shown a first image memory 1, a binary digitizer 2 and a second image memory 3, which are the same as those disposed in the apparatus shown in FIG. 1. There are also shown a labeller 41, a fourth image memory 51, a characteristics calculator 61, a discriminator 71 and a fifth memory 81.

The labeller 41 recognizes mutually connected picture elements as one picture element group region among picture elements having value "1" on the second image memory 3 and applies an individual label to each of the regions capable of distinguishing from other regions. The function of the labeller 41 is shown in FIG. 9.

Figure 9:
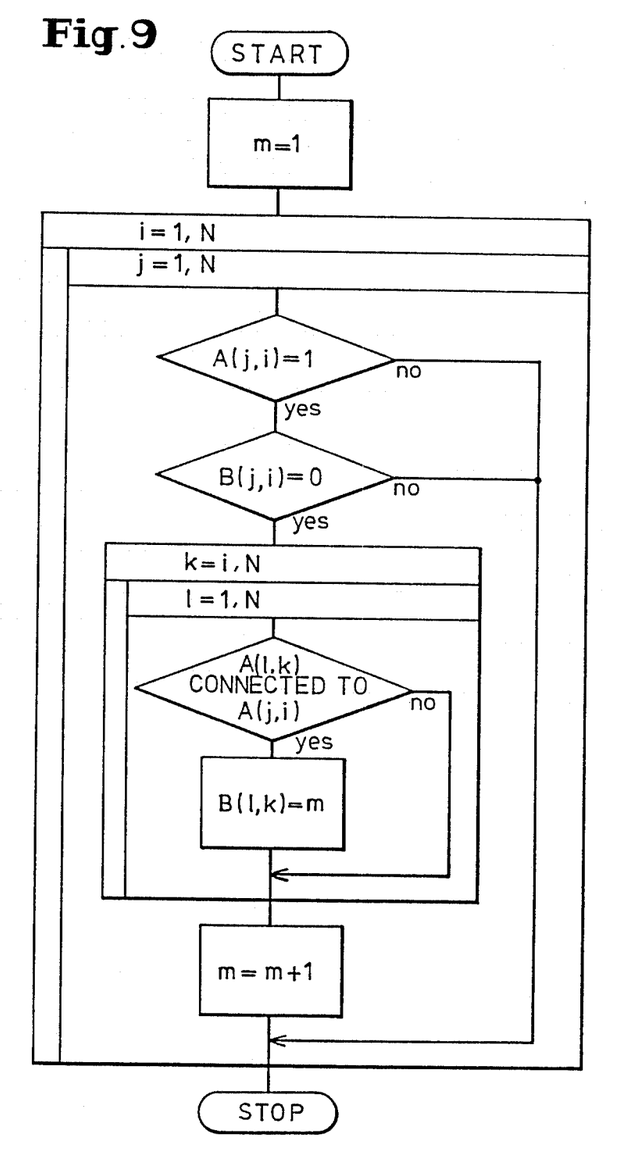
FIG. 9 is a flow chart showing the function of the labeller in FIG. 8.

In FIG. 9, m represents the value for the label which starts from 1. When the value of one image data A(j, i) inputted from the second image memory 3 is 1 and the value of the stored data B(j, i) of the corresponding fourth image memory 51 is 0, the image data A(l, k) of the second image memory 3 are judged whether they are connected or not with an image data A(j, i) and, if there are connected image data, the output data B(l, k) with a value of m are written into the fourth image memory 51. The procedures are repeated while varying the value l from 1 to N and the value k from 1 to N. In this way, the same label is attached to the image data A(l, k) connected with the image data A(j, i). On every completion of attaching one label, the value of the label is increased by 1 and the same processings are repeated for other image data A(j, i).

The characteristics calculator 61 is a device that calculates the characteristics amount of the CT reconstructed image on the first image memory 1 corresponding to each of the regions labelled as described above. The characteristics amount include the area of the region, average CT value within the region and the standard deviation for the CT value in the region.

Figure 10:
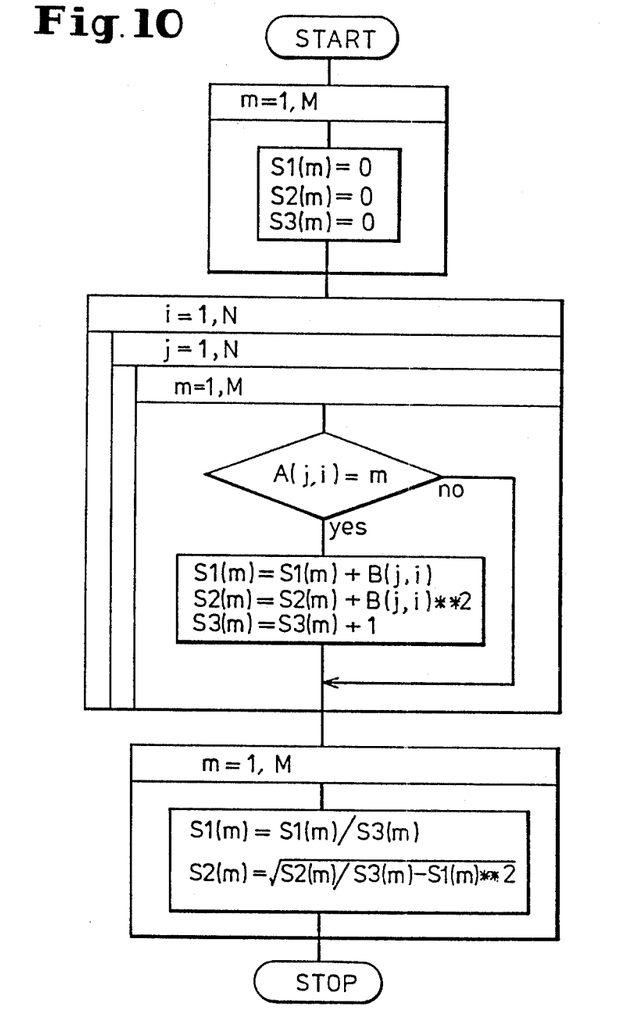
FIG. 10 is a flow chart showing the function of the characteristics calculator in FIG. 8.

The function of the characteristics calculator 61 is shown in FIG. 10.

In FIG. 10, S1(m), S2(m) and S3(m) are three kinds of calculation values specified on every label m and their initial values are set to zero. m takes a value from 1 to M. M is given from the labeller 41. When the label for the data A(j, i) inputted from the fourth image memory 51 is m, the sum S1(m) of the image data B(j, i), the sum S2(m) for the square of the image data B(j, i) and the area S3(m) of the image with the label being m of the first image memory corresponding to the above-mentioned data A(j, i) are determined within a range where m is from 1 to M and j and i are from 1 to N. Then, the average value S1(m) and the standard deviation S2(m) of the image data are determined on every label by using these calculated values at the next step. After the calculation, S1(m) and S2(m) represent the average value and the standard deviation of the image data in the region with the label M respectively.

The discriminator 71 compares the characteristics amount given from the characteristic calculator 61 with each of the previously given threshold values, discriminates the region capable of satisfying the conditions as the bone region and writes the image into the fifth image memory 81.

Figure 11:
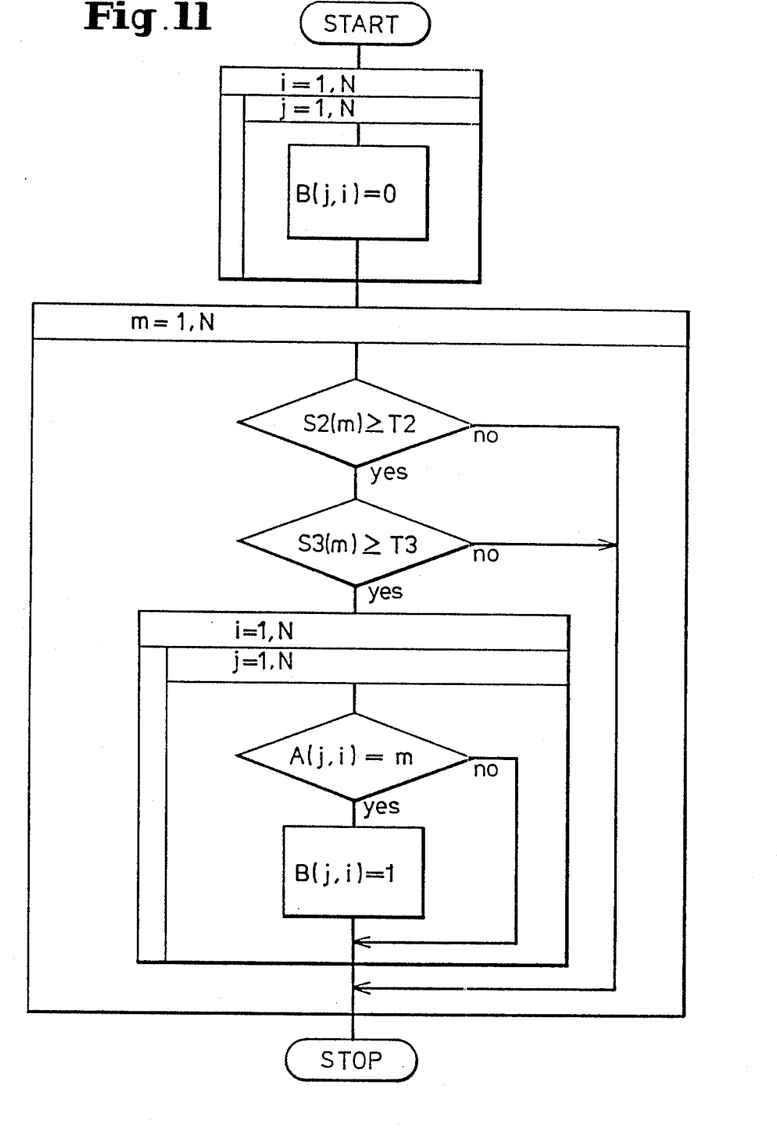
FIG. 11 is a flow chart showing the function of the discriminator.

The function of the discriminator 71 is shown in FIG. 11.

Figure 12:
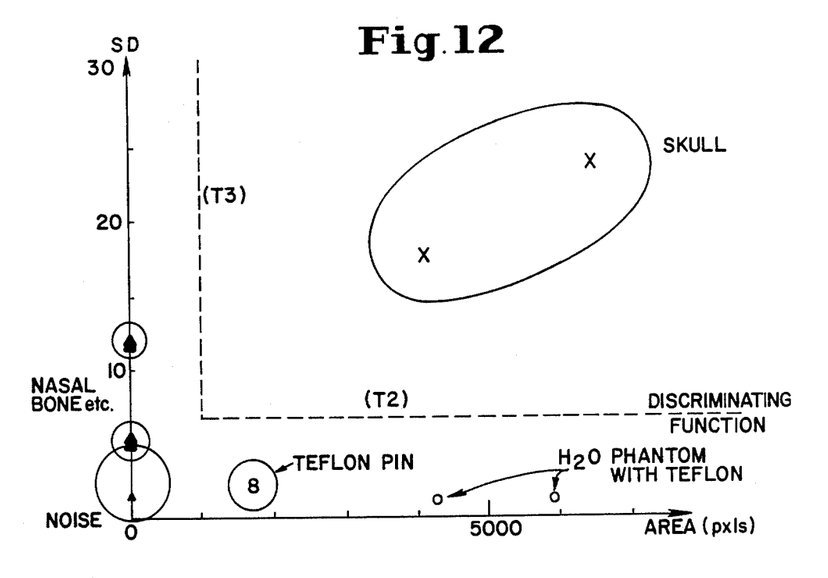
FIG. 12 is a graph showing the distribution of the characteristics amount as the object to be scanned.

In FIG. 11, the initial values for the image data B(j, i) of the fifth image memory 81 are set to zero and, if the standard deviation S2(m) and the area S3(m) of the image data of the label m region are in excess of threshold values T2 and T3 respectively, the image data B(j, i) in the fifth image memory 81 corresponding to the data A(j, i) in the fourth image memory 51 belonging to the region are set to 1. The area of the region and the standard deviation of the CT value in that region have a relationship as shown in FIG. 12, in which the skull has characteristics clearly distinguished from Teflon or other bones. In view of the above, by determining the threshold values T2 and T3 for the standard deviation and the area respectively, for example, as shown by the dotted lines, the skull can be discriminated from other objects or image noises. Accordingly, images only from the skull mainly causing the beam hardening artifact can be obtained in the fifth image memory 81 by the discriminator 71 that discriminates based on the threshold values T2 and T3.

The operation in the apparatus having thus been constituted as shown in FIG. 8 will now be explained. The X-ray CT reconstracted image inputted to the first image memory 1 is binarized in the binary digitizer 2 using a previously determined CT value and stored in the second image memory 3.

The labeller 41 gathers mutually connected picture elements among those elements having a value "1" on the second image memory 3 into a region and attaches thereto discriminating labels, for example, labels 1, 2, . . . . In this way, all of the picture elements having the value "1" belong to regions attached with some or other labels. The total number M of the regions in this case is sent to the characteristics calculator 61 and the discriminator 71 where it is served as the information for the control.

The characteristics calculator 61 calculates the characteristics amount of the CT reconstructed image on the image memory 1 corresponding to all of the labelled regions.

The discrimilator 71 discriminates whether S2(m)≧T2 and S3(m)≧T3 with respect to the thus determined characteristics amount and, if the conditions are satisfied, recognizes the region as the bone region requiring the beam hardening correction.

In this way, the bone region requiring the beam hardening correction can correctly be recognized.

By restricting the range of the calculation for the characteristics amount only to the inner points in each of the regions, the scattering range of the standard deviation due to the rising error in the edge portions of the region can be decreased and stable calculation for the characteristics amount is made possible. The characteristics amount shown in FIG. 12 has been calculated in this way. Further, the calculation for the characteristics amount can also be made as one operation simultaneously with the labelling.

In this way, since the bone region requiring correction for the beam hardening is discriminated by using, as the characteristics amount, the area and the statistic amount of the standard deviation within the region of the CT value, stable result of discrimination insensitive to the image noises can be obtained.

The X-ray CT image processing apparatus using the bone region discriminator as described above has a constitution as shown in FIG. 13, in which weighing addition is carried out by the masked adder 5 while using the image for the skull obtained in the fifth image memory 81 as a mask.

In the embodiment of this invention as described above, since the 2-dimensional weight function is added by the number of the picture elements representing the bone and it may some time requires a considerable amount of calculation. In view of the above, by adding the weight function in a 2-dimensional mode using the binarized image as a mask after reducing both of the binarized image representing the bone and the weight function to 1/G in vertical and horizontal directions and repeating the addition for all of the picture element representing the bone, the calculation amount can be decreased and the high speed processing can be realized by so much.

Figure 14:
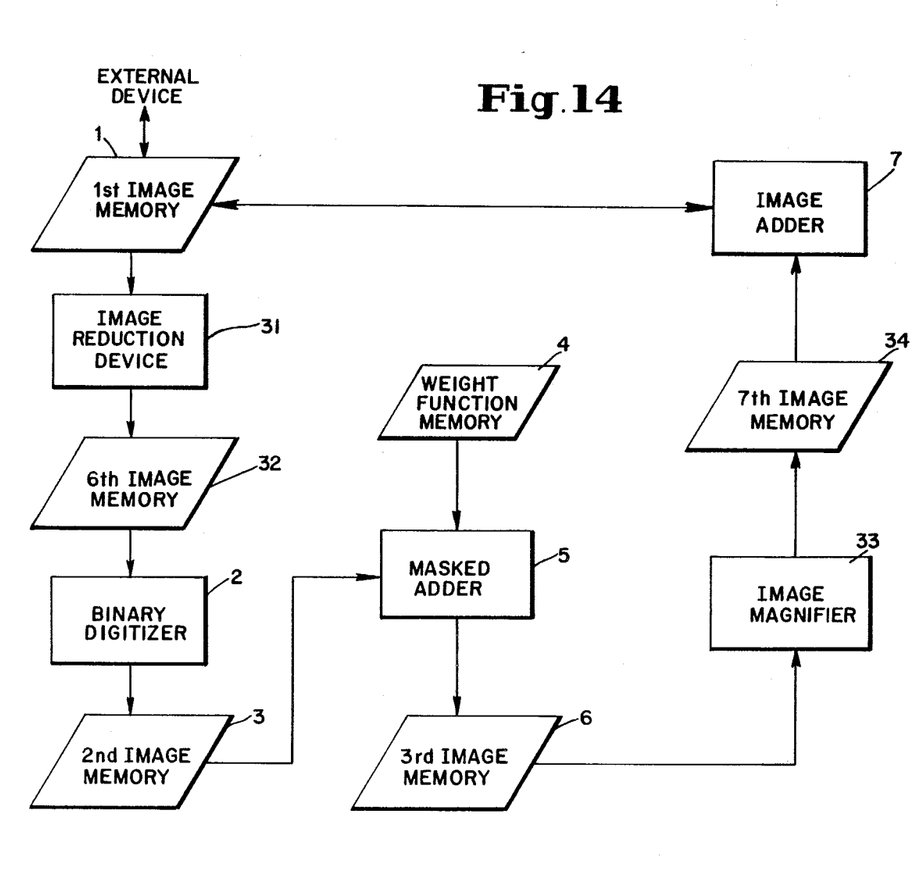
FIG. 14 is a block diagram for one embodiment of the X-ray CT image processing apparatus according to this invention, in which the processing time is shortened.

FIG. 14 is a constitutional view showing one embodiment of the X-ray CT image processing apparatus intended for such a high speed processing. In FIG. 14, the corresponding portions as those in FIG. 1 carry the same reference numerals. The constitutional portions different from those in FIG. 1 are an image reduction device 31, a sixth image memory 32, an image magnifier 33 and a seventh image memory 34.

The image reduction device 31 receives the image from the first image memory 1 and reduces the same into 1/G in both of the vertical and horizontal direction, the result of which is stored in the sixth image memory 32. The output from the sixth image memory 32 is introduced to a binary digitizer 2.

Figure 15:
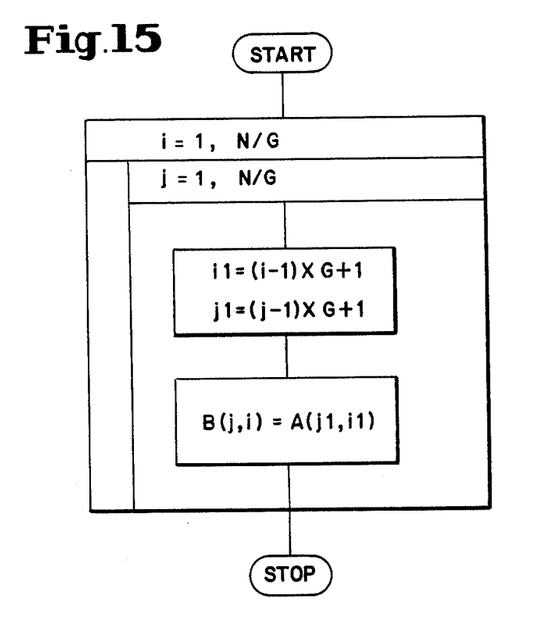
FIG. 15 is a flow chart showing the function of the image reduction device in FIG. 4.

The function of the image reduction device 31 is shown in FIG. 15.

In FIG. 15, the respective components i, j of the 2-dimensional address in the image data are converted into i1, j1 respectively by a pair of equations described in the central block in the figure and the image data A(j1, i1) read out from the first image memory 1 are rendered as the image data B(j, i) to be written into the address (i, j) in the fourth image memory 32.

The image magnifier 33 magnifies the reduced image of the third image memory 6 by the factor of G and into the size of the original image.

Figure 16:
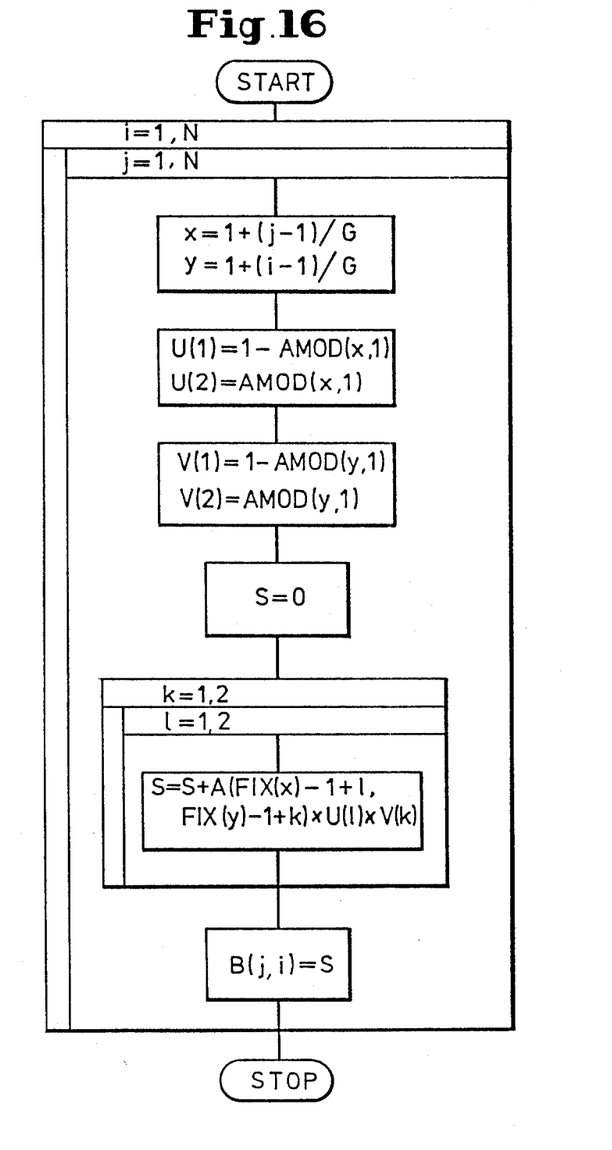
FIG. 16 is a flow chart showing the function of the image magnifier in FIG. 14.

The function of the image magnifier 33 is shown in FIG. 16.

FIG. 16 shows the function of conducting 2-dimensional interpolation that makes a plurality of linearly interpolated data between each of the data of the reduced image from the third image memory 6 to restore the image of the initial size. The write address j and i into the seventh image memory 34 are converted by the illustrated equation into variables X and Y respectively, and the interpolation parameters U(1), U(2) and V(1), V(2) are determined based on these variables X and Y, to determine the 2-dimensionally interpolated data according to the equation providing the S shown in the drawing to render the same as the written image data B(j, i) into the seventh image memory 34.

The magnified image is once stored in the seventh image memory 34 and then sent into the image adder 7.

The operation of the apparatus having thus been constituted shown in FIG. 14 will now be explained next.

The X-ray CT reconstructed image inputted from the external device to the first image memory 1 is reduced into 1/G both in the vertical and horizontal directions in the image reduction device 31 and then stored in the sixth image memory 32. An integer usually employed for G.

The reduced image in the memory 32 is binarized in the binary digitizer 2 in accordance with a previously determined CT value and then stored in the second image memory 3.

The weight function in the weight function memory 4 is also assumed to be reduced previously both in the vertical and horizontal directions into 1/G corresponding to the reduction rate 1/G as described above. In the masked adder 5, the weight function from the weight function memory 4 is added to store in the third image memory 6 while aligning the center with each of the picture elements representing the bone of the binary image (memory 3). The initial memory values for the third image memory 6 are set to zero. Since the result of the addition treatment for all of the picture elements representing the bone constitutes the correction image for the reduced image, they are magnified by the factor of G in the image magnifier 33 to restore into the initial size. A linear interpolation is employed for the magnification in order to shorten the calculation time, in which 2-dimensional interpolation is effected while being divided into two steps on every one dimension. The magnified image is stored in the seventh image memory 34 and the magnified and corrected image is added in a 2-dimensional manner to the input image on the first image memory 1, the result of which is outputted to the first image memory 1.

The following means may also be employed not restricted to the embodiments as described above.

(1) The image is not actually reduced in the image reduction device 31 but sampled to binarize on every G picture elements both in the vertical and horizontal directions while being integrated with the binary digitizer 2.

(2) The image from the image magnifier 33 is not passed through the seventh image memory 34 but directly added with the image from the first image memory.

(3) The mask adder 5 is replaced with the 2-dimensional convolution device.

(4) The image reduction device 31, the sixth image memory 32 and the second image memory 3 are not used but the mask adder 5 is turned ON and OFF in accordance with the values on every G sample outputted from the binary digitizer 2.

(5) The apparatus as shown in FIG. 8 is utilized for the discrimination of the bone region.

INDUSTRIAL APPLICABILITY

As described above according to this invention, the bone-induced beam hardening can be corrected equivalently to that of Joseph, at al.'s method by properly setting the weight function, whereby images with a clear discrimination between the brain and the skull and with no bone-induced capping can be obtained.

In addition, since the data processing for the above comprises merely repeating simple calculations between the images based on the reconstructed image, as compared with the conventional processings that require complicate and enormous calculation amount of repeating scanning again on the image, examining the components in the paths thereof to thereby compensate the actual scan data and reconstructing them again, it is extremely practical in view of the simplicity of the algorithm and the minority of the calculation amount.

Figure 13:
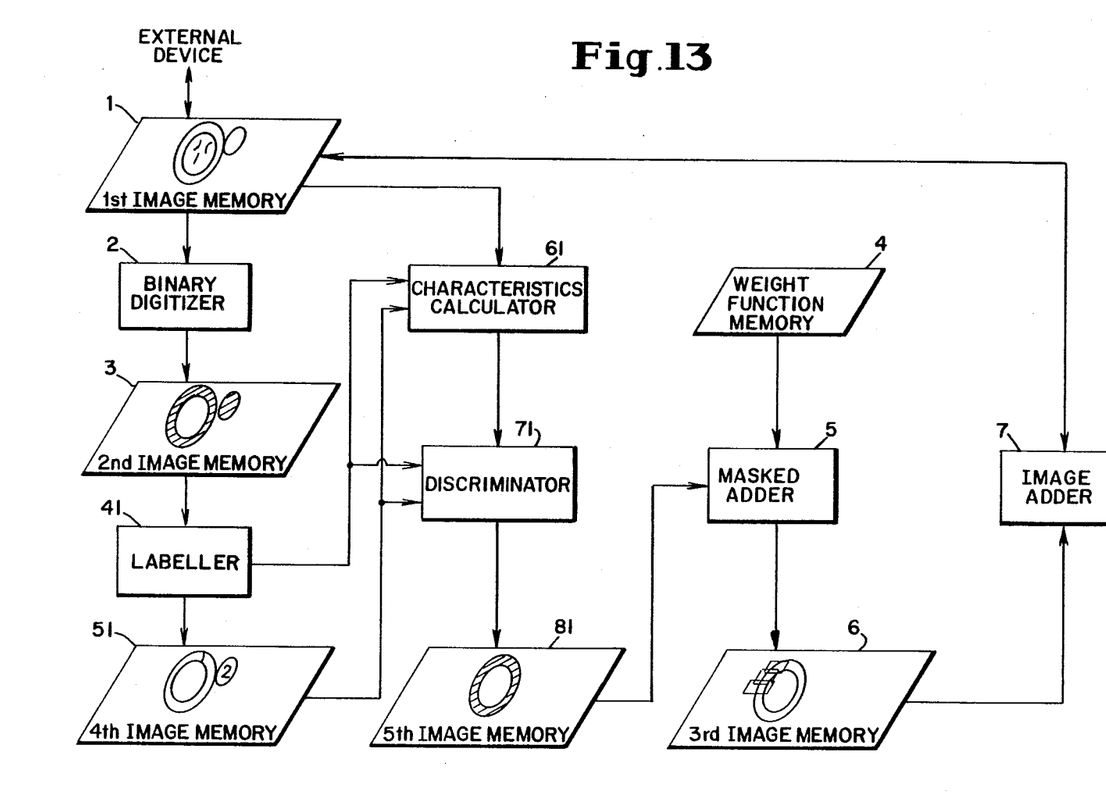
FIG. 13 is a block diagram showing one embodiment of the X-ray CT image processing apparatus practicing this invention by using the device in FIG. 8 for the discrimination of the bone region.

For instance, assuming the image used as of 320×320 picture elements and weight function used is of 61×61 picture elements, for instance, while about 15 hours have been taken in Joseph, et al.'s method, the processing time required is only about 50 minutes according to this invention, Further, according to this invention as shown in FIG. 13, procession for removal of the the beam hardening artifact can be effected after correctly discriminating the bone region requiring the beam hardening correction.

Furthermore, according to this invention as shown in FIG. 14, since the image is initially reduced to $1/G^2$, followed by the binarization and addition of weight function for the reduced image, and because of the use of the weight function reduced to $1/G^2$ from the initial size, the number of addition is decreased from $M^2 \times k$ where the reduction is not effected into $(M/G)^2 \times k/G^2$, that is, reduced to $1/G^4$. In this case $M^2$ represents the area of the weight function by the number of picture elements and k represents the number of picture elements representing the bone.

According to the computer simulation, the degradation in the image quality is less than ± 1CT value at $G=4$, $M=61$, and the calculation time is reduced to $1/203$ as compared with the case where no reduction is effected.

The system of using the reduced images can be obtained as the result of the skillful utilization of the phenomenon that the correction image for the bone-induced beam hardening contains only the low frequency spatial components.

I claim:

1. An X-ray CT image processing apparatus comprising
    an image memory means (1) for storing the tomographic image of an object to be examined reconstructed based on a plurality of signals representing the intensity of X-rays passing through the cross section of the object in a plurality of directions within the cross section thereof,
    a bone image extraction means (2,3) connected to said image memory means for extracting an image representing the bone from the image stored in said image memory means,
    a weight function memory means (4) for storing 2-dimensional weight functions,
    a correcting image forming means (5,6) connected to said weight function means and to said bone image extraction means, for forming a correcting image by adding 2-dimensional weight function provided from the weight function memory means while aligning the center with the image data of the bone image extracted by said bone image extraction means by using said bone image as a mask, and
    an image addition means (7) connected to said image forming means and to said image memory means, for adding the correcting image formed by said correcting image forming means to the reconstructed image of said image memory means.

2. An X-ray CT image processing apparatus comprising
    an image memory means (1) for storing the tomographic image of an object to be examined reconstructed based on a plurality of signals representing the intensity of X-rays passing through the cross section of the object in a plurality of directions within the cross section thereof,
    a bone image extraction means (2,3) connected to said image memory means for extracting an image representing the bone from the image stored in said image memory means,
    a weight function memory means (4) for storing 2-dimensional weight functions,
    a correcting image forming means (5,6) connected to said weight function means and to said bone image extraction means for forming a correcting image by carrying out convolution between the 2-dimensional weight function provided from said weight function memory aand the bone image data by using the bone image extracted by said bone image extract means as a mask, and
    an image addition means (7) connected to said correcting image forming means and to said image memory means, for adding the correcting image formed by said correcting image forming means to the reconstructed image of said image memory means.

3. The X-ray CT image processing apparatus as defined in claim 1 or claim 2 wherein the bone image extraction means comprises binarization means for determining the binarized image by discriminating the image data stored in the image memory means based on a predetermined threshold value.

4. The X-ray CT image processing apparatus as defined in claim 1 or claim 2 wherein the bone image extraction means comprises binarization means for determining the binarized image by discriminating the image data stored in the image memory means based on a predetermined threshold value,
    a characteristic calculation means (61) for determining the characteristics amount of the reconstructed image of the image memory means corresponding to the binarized image provided from the binarization, and
    a discrimination means (71) for determining the bone image based on the characteristics amount determined by the characteristics calculation means.

5. An X-ray CT image processing apparatus comprising
    an image memory means (1) for storing the tomographic image of an object to be examined reconstructed based on a plurality of signals representing the intensity of X-rays passing through the cross section of the object in a plurality of directions within the cross section thereof,
    an image reduction means (31,32) connected to said image memory means for determining a reduced image based on the image stored in the image memory means,
    a bone image extraction means (2,3) connected to said image reduction means for extracting an image representing the bone from the reduced image provided by said image reduction means,
    a weight function memory means (4) for storing 2-dimensional weight functions,
    a correcting image forming means (5,6) connected to said weight function means and to said bone extraction means, for forming a correcting image based on the bone image provided from the bone image extraction means and a 2-dimensional function provided from the weight function memory means,
    an image magnifying means (33,34) connected to said image forming means for magnifying the correcting image provided from the correcting image forming means to a size corresponding to the size of the reconstructed image stored in the image memory means, and
    an image addition means (7) connected to said image magnifying means for adding the correcting image provided from the image magnifying means to the reconstructed image of the image memory means.

* * * * *